F. C. MUSSO.
MEASURING AND FILLING MACHINE.
APPLICATION FILED FEB. 28, 1911.

997,933.

Patented July 11, 1911.

3 SHEETS—SHEET 1.

Witnesses.
Charles Pickles

Inventor:
Frank C. Musso
By G. H. Strong
Atty

F. C. MUSSO.
MEASURING AND FILLING MACHINE.
APPLICATION FILED FEB. 28, 1911.
997,933.
Patented July 11, 1911.
3 SHEETS—SHEET 2.
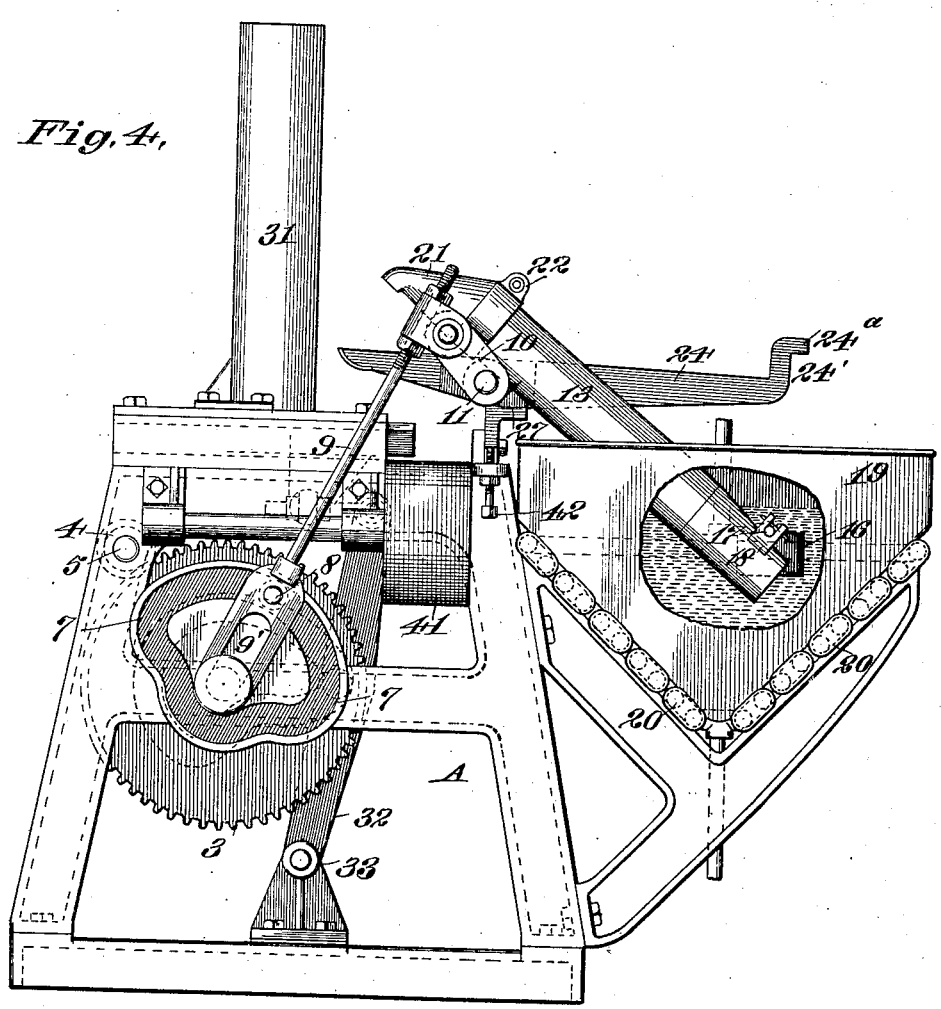
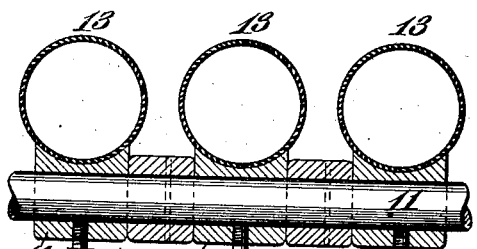
Witnesses,
Charles Pickles
R. S. Berry
Inventor;
Frank C. Musso
By G. H. Strong
Atty F. C. MUSSO.
MEASURING AND FILLING MACHINE.
APPLICATION FILED FEB. 28, 1911.
997,933.
Patented July 11, 1911
3 SHEETS—SHEET 3.
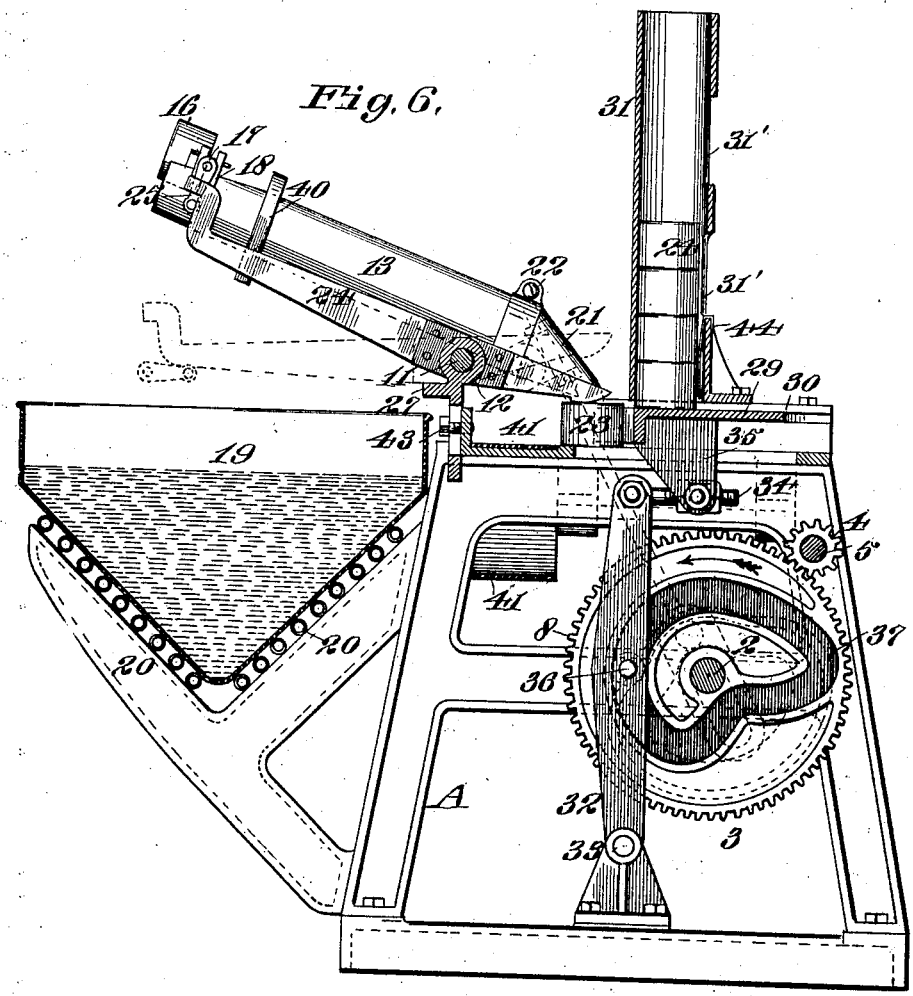
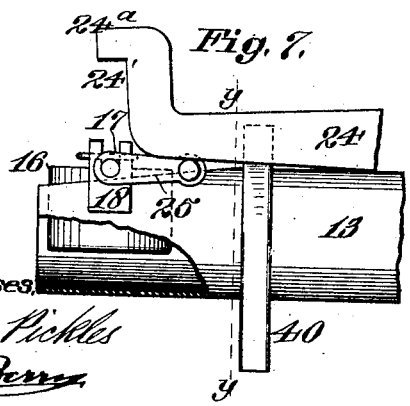

UNITED STATES PATENT OFFICE.

FRANK C. MUSSO, OF SAN JOSE, CALIFORNIA.

MEASURING AND FILLING MACHINE.

997,933.  Specification of Letters Patent.  Patented July 11, 1911.

Application filed February 28, 1911. Serial No. 611,340.

*To all whom it may concern:*

Be it known that I, FRANK C. MUSSO, a citizen of the United States, residing at San Jose, in the county of Santa Clara and State of California, have invented new and useful Improvements in Measuring and Filling Machines, of which the following is a specification.

This invention relates to a machine for measuring and packaging liquids, and particularly pertains to a means, in a can filling apparatus, for controlling the delivery and measuring the quantity of the materials being canned.

It is the object of this invention to provide a machine for filling cans, or other receptacles, with liquid or semi-liquid substances, such as jelly, preserves, cooked fruits, soups and the like, and which is so constructed and arranged as to operate automatically to deliver a measured amount of the substance to be canned to a can or other receptacle only at such moment as the can is in a filling position.

Another object is to provide means for feeding empty cans to the filler, and means by which the empty can serves as a controller for operating the discharging mechanism.

A further object is to provide a machine of the above character in which the use of valves is obviated, thus doing away with an objectionable feature commonly met with in can filling machines.

The invention consists of the parts and the construction and combination of parts, as hereinafter more fully described and claimed, having reference to the accompanying drawings, in which—

Figure 1:
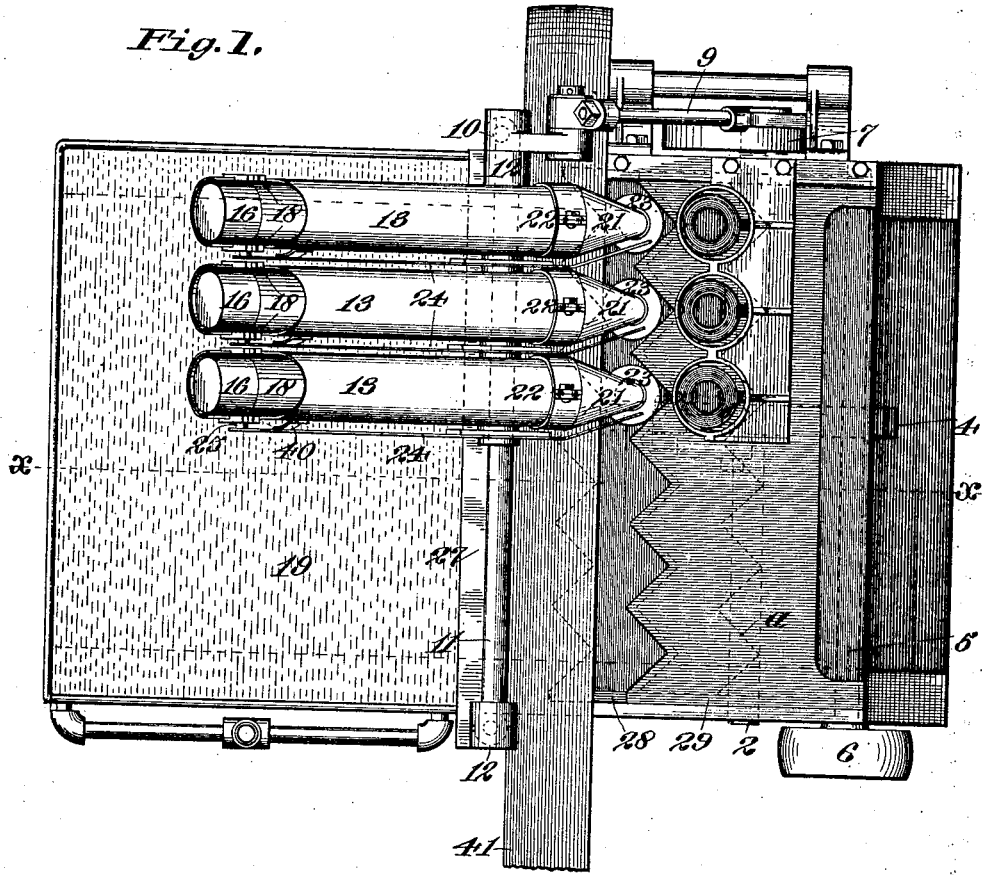
Figure 2:
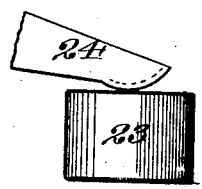
Figure 3:
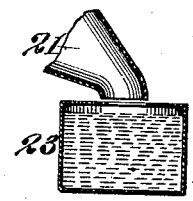

Figure 1 is a plan view of the invention with parts removed. Fig. 2 is a detail showing a can as positioned to operate the filling mechanism. Fig. 3 is a detail in section showing a can in the filling position. Fig. 4 is an end elevation of the invention with parts broken away. Fig. 5 is a detail in section showing the manner of mounting the filling tubes. Fig. 6 is a sectional elevation on the line X—X, Fig. 1. Fig. 7 is a detail of the measuring device and the dumping mechanism. Fig. 8 is a section on the line Y—Y, Fig. 7.

In the drawings A represents the machine frame, which may be of any suitable construction, and which is designed to support the various elements constituting my invention and the parts necessary to its operation.

Extending the length of the frame A and supported in suitable bearings thereon, is a counter-shaft 2 on which a gear 3 is mounted, this gear 3 meshing with a pinion 4 on a drive shaft 5 which is adapted to be rotated by means of a pulley 6 from any suitable source of power. Mounted on one end of the counter-shaft 2, exterior of the frame A, is a grooved cam 7 which engages a roller or pin 8 on a link 9. This link 9 is slotted on its lower end, as at 9′, through which slot the counter-shaft 2 extends to act as a guide for the link 9 and maintain the pin 8 in a certain fixed relation with the cam 7. The upper end of the link 9 is pivoted to a crank arm 10 on the end of a rock-shaft 11, which is mounted in adjustable bearings 12 on the upper portion of the frame A, and which extends parallel with the counter-shaft 2. The rock-shaft 11 is designed to support a series of tubes or troughs 13 which are disposed at right angles thereto and are rigidly, though adjustably, mounted thereon; a sleeve 14 attached near one end of each trough 13 being mounted on the shaft 11 and secured thereto by means of a set screw 15. This manner of mounting the troughs 13 permits of adjusting their positions in circumferential relation to the rock-shaft 11. These troughs 13 are designed to be rocked in unison with the rock-shaft 11 as the latter is operated by the link 9 and cam 7, so as to cause the troughs to alternately assume a downwardly inclined and an upwardly inclined position.

Mounted on the outer end of each of the troughs 13 is a normally horizontally disposed bucket or dipper 16, which is supported by means of trunnions 17 formed thereon in bearings 18 attached to the troughs 13. These dippers 16 are so disposed as to extend into the troughs 13, a portion of the upper face of each trough being removed to admit of the dipper depending therethrough so as to be suspended in the tube at a point adjacent its end and over the bottom thereof, as shown in Fig. 7, and by reason of being balanced on the trunnions 17 are caused to assume a normally horizontal position irrespective of the inclined positions assumed by the troughs 13. The purpose of these dippers 16 is to dip up a quantity of the materials to be canned when the outer ends of the troughs 13 are submerged in the substances which are contained in a tank or caldron 19, as later described. The tank 19 is supported upon steam coils 20, mounted on brackets formed on the frame A, and is disposed adjacent the rock-shaft 11, as shown in Figs. 4 and 6.

The inner end of each of the troughs 13, adjacent the rock-shaft 11, is provided with an interchangeable nozzle 21 which is attached to the trough by means of a clamp 22, and is designed to enter or be disposed above the mouth of a can, or other receptacle, 23, when the outer end of the trough 13 is in its uppermost position, as shown in Figs. 3 and 6.

Means are provided whereby the dipper 16 is caused to rock and discharge its contents into the trough 13 the moment the nozzle 21 is registered with a can 23 and when the outer end of the trough is in its uppermost position, so that the substances previously dipped from the tank 19 will flow down the interior of the tubular trough and enter the can through the nozzle 21. This means for tipping the dipper 16 is designed to be operable only when a can 23 is beneath the nozzle 21, so that in event the can feeding mechanism, to be later described, should fail to deliver a can to a filling nozzle, the contents of the dipper would not be discharged and thereby wasted. Mechanical devices of various construction may be employed for accomplishing this purpose, but is here shown as including a lever 24 which is fulcrumed on the rock-shaft 11 and a crank 25 which is mounted on one of the trunnions 17 of the dipper 16, which crank is adapted to be operated by the lever 24, as later described, one of these levers 24 being disposed alongside each of the troughs 13, as shown in Figs. 1 and 5. Each lever 24 is free to rock on the rock-shaft 11 and normally extends in a horizontal position, as shown in Fig. 4, the long end of the lever resting upon a shelf 27 supported by the adjustable bearings 12, with its outer end arranged above the crank 25, and its inner end disposed above a table 28 at a point corresponding to the position occupied by a can at the moment of filling.

Means are provided for automatically delivering the cans 23 to the filling position beneath the nozzles 21 and the levers 24, and for removing the filled can from the machine. This means is here shown as consisting of a reciprocal carriage 29, which extends longitudinally over the table 28 and is slidable laterally thereon, the outer ends of the carriage being supported in guides 30. Disposed above the table 28 is a series of vertically arranged cylindrical can-hoppers 31, one of these hoppers being located in line with each trough 13, the series of tubes being in alinement with each other at a point in front of the rearwardmost position occupied by the forward edge of the carriage 29.

The carriage 29 is reciprocated by means of a lever 32 which is fulcrumed at its lower end at 33 and is pivoted at its upper end to a bolt 34 which is adjustable in a hanger 35 depending from the under side of the carriage 29. A pin or roller 36 on the lever 32 about midway of its length is engaged by a grooved cam 37 formed on the face of the gear 8, which cam is so shaped that the carriage 29 will be given an intermittent or interrupted forward movement and a continuous return movement as the cam 37 revolves; the carriage pausing in its forward movement midway of its travel to admit of the can being filled, as later described.

The operation of the invention is as follows: The can-hoppers 31 being filled with cans 24, and the counter-shaft 2 and the cams 7 and 37 revolved, the carriage 29 is caused to move to its rearwardmost position, indicated by dotted lines at $a$ in Fig. 1, to permit the lowermost cans in the hoppers to drop upon the table 28 in front of the forward edge of the carriage 29. Simultaneous with this operation, the cam 7 actuates the link 9 and rock-shaft 11 to cause the outer ends of the troughs 13 to be submerged in the contents of the caldron 19, as shown in Fig. 4, which action fills the dippers 16. A continued rotation of the cams 37 causes the carriage 29 to move forward to the intermediate position shown in Fig. 1 to dispose the cans 23 in a position to be filled, whereupon the carriage 29 comes to a momentary stop. The cans 23 are caused to be spaced and held in alinement by reason of a serrated or toothed formation given the forward edge of the carriage, the cans 23 being fed between the projecting members thus formed. The moment the carriage 27 comes to a stop, the funnels 21 on the troughs 13 are disposed over the open ends of the cans 23 by reason of the troughs 13 being rocked into an elevated position by the continued rotation of the cam 7. In the meantime, the levers 24, being engaged at their outer ends by means of a yieldable member or spring 40 mounted on the troughs 13, are caused to move in unison with the troughs 13 until the inner ends of the levers 24 contact the upper edges of the cans. This contact with the cans acts to stop the movement of the levers 24 so that a continued movement of the troughs 13 will cause the levers 24 to depress the springs 40 and bring the lower edges of the levers to bear upon the cranks 25. Further movement will cause the cranks 25 to be depressed from a horizontal into a vertical position so as to dump the dippers 16 and empty their contents into the troughs 13 and deliver the materials to the cans 23 through the nozzles 21. As a means of insuring a complete emptying of the dippers 16, they are retained in a tilted position, as shown in Fig. 6, by reason of the pins on the cranks 25 being engaged by the lower edges of the levers 24 passing over the ends of the levers when they are engaged by a shoulder 24' formed thereon. An offset 24ª is provided on the shoulder 24' to prevent the lever 24 from dropping when the crank 25 passes around its end. As soon as the cans 23 receive their charge, the outer ends of the troughs 13 are again plunged into the tank 19, the levers 24 returning to normal by means of the frictional engagement of the plate springs 40 or by gravitation. The moment the nozzles 21 and levers 24 are removed clear of the cans 23, the carriage 29 continues its forward movement so as to shove the filled cans upon an endless, traveling belt 41, which passes over the table 28 in a recess formed on the top thereof. This belt 41 may be rotated in any suitable manner and conveys the filled cans to any desired point. The operation just described, having been performed, the carriage 29 is again moved to its rearmost position and the dippers resubmerged in the tank 19 ready for another operation.

From the foregoing it will be seen, that in event a can is not delivered to any of the nozzles 21, the lever 24 will not be operated, the dipper 16 thus remaining in its normal horizontal position as the conveyer troughs 13 are rocked. The dipper is not emptied into the conveyer unless a can is in a position to receive the charge.

The bearings 12 are adapted to be adjusted vertically so as to vary the inclinations of the troughs 13 or adapt them to cans of various heights. The means for making this adjustment consists of a screw-bolt 42 which is threaded in the frame A and bears against the under side of the bearing 12, as shown in Fig. 4. By operating the bolts 42 the bearings 12 may be raised or lowered as desired, a bolt 43 extending through a slot in a downwardly projecting member on each of the bearings 12 and threaded in a rigid member on the frame, as shown in Fig. 6, is tightened to retain the bearings 12 in the desired position.

The purpose of the bolt 34 is to provide an adjustable connection between the lever 32 and the carriage 29 so that the relation of the forward edge of the carriage may be varied to suit the diameter of the can being used, thereby adapting the can-feeding mechanism to the handling of cans of various sizes.

The can-hoppers 31 are interchangeable, hoppers of different diameters being employed for the different sized cans. Each of the hoppers 31 is slotted at 31' to admit of the operator determining the number of cans therein and a plate spring 44 is mounted on each hopper near the discharge end, which spring bears against the lowermost can in the hopper to retain the can against the inner face of the hopper.

Having thus described my invention, what I claim and desire to secure by Letters Patent, is—

1. In a machine for packaging liquids, the combination of a trough, means for rocking the same, a bucket pivotally mounted on the trough, and means operable by a receptacle for tipping said bucket.

2. In a machine for packaging liquids the combination with a trough, of a bucket pivotally mounted thereon, means controllable by a receptacle for tipping said bucket, and means for rocking said trough longitudinally.

3. In a machine for packaging liquids, the combination of a trough, a bucket pivotally mounted thereon, means for rocking said trough longitudinally to carry said bucket in and out of the liquids to be packaged, and means controllable by the package to be filled for emptying said bucket in said trough.

4. In a machine for packaging liquids, the combination of a trough, a bucket pivotally mounted thereon, means for rocking said trough longitudinally to carry said bucket in and out of the liquids to be packaged, means controllable by the package to be filled for emptying said bucket in said trough, and means for disposing said package in a position to receive the charge delivered to the trough.

5. In a machine for packaging liquids, the combination of a rock-shaft, a trough rigidly mounted thereon, a rockable bucket mounted on said trough, said bucket normally suspended in a horizontal position, means for rocking said rock-shaft to oscillate said trough and carry the bucket in and out of the liquid to be packaged, and means controllable by the package to be filled for tipping the bucket to empty its contents in the trough.

6. In a machine for packaging liquids, the combination of a rock-shaft, a trough rigidly mounted thereon, a rockable bucket mounted on said trough, said bucket normally suspended in a horizontal position, means for rocking said rock-shaft to oscillate said trough and carry the bucket in and out of the liquid to be packaged, and means controllable by the package to be filled for tipping the bucket to empty its contents in the trough, said means embodying a trip lever engageable by the package and a crank on the bucket adapted to be actuated by said lever.

7. In a machine for packaging liquids, the combination of a rock-shaft, a trough rigidly mounted thereon, a rockable bucket mounted on said trough, said bucket normally suspended in a horizontal position, means for rocking said rock-shaft to oscillate said trough and carry the bucket in and out of the liquid to be packaged, means controllable by the package to be filled for tipping the bucket to empty its contents in the trough, said means embodying a trip lever engageable by the package and a crank on the bucket adapted to be actuated by said lever, said bucket tipping means arranged to operate when the bucket is approximate to its uppermost position, and means for disposing the package in a position to receive the charge delivered to the trough.

8. In a machine for packaging liquids, the combination of a rock-shaft, a trough rigidly mounted thereon transverse thereto, a bucket pivotally mounted on said trough and suspended thereabove, means for operating said rock-shaft to carry said bucket in and out of the liquid to be packaged, means for delivering an empty package to the discharge end of said trough, and means controllable by a package so disposed for tipping said bucket to spill its contents in said trough when the bucket is approximate to its uppermost position.

9. In a measuring and filling machine, the combination of an oscillating trough, a hinged receptacle at one end of said trough, and means operable by contact with a package on the oscillation of the trough to tip the receptacle and dump its contents into the trough.

10. In a measuring and filling machine, the combination of an oscillating trough, a normally upright receptacle carried thereby, and means operable by contact with a package on the oscillation of the trough to tilt the receptacle and dump its contents into the trough.

11. In a measuring and filling machine, the combination of a trough adapted to oscillate in a vertical plane, a measuring receptacle carried thereby, and means actuated by contact with a package on the oscillation of the trough to deliver the contents of the receptacle into the trough.

12. In a measuring and filling machine, the combination of an oscillating trough, a hinged receptacle at one end of said trough, and means operable by contact with a package on the oscillation of the trough to tip the receptacle and dump its contents into the trough, said last named means including a crank on the receptacle and an oscillating lever in the path of the crank.

13. In a measuring and filling machine, the combination of an oscillating trough, a hinged receptacle at one end of said trough, and means operable by contact with a package on the oscillation of the trough to tip the receptacle and dump its contents into the trough, said last named means including a crank on the receptacle and a stop in the path of the crank.

14. The combination with a can carrier, of a measuring and filling mechanism comprising an oscillating trough, a measuring receptacle movable with the trough and adapted and arranged to dump into the trough when the trough is in position to fill a can, and means for effecting movement between the can and the receptacle whereby the receptacle will only dump when a can is in position for filling.

15. The combination of a can carrier, an oscillating trough, a measuring receptacle hingedly mounted on the trough, a crank arm on the receptacle, an oscillating lever for actuating the crank to cause it to dump, and means for operating the lever from the cans on the carrier.

In testimony whereof I have hereunto set my hand in the presence of two subscribing witnesses.

FRANK C. MUSSO.

Witnesses:
JOHN H. HERRING,
EDW. M. HANSON.